United States Patent [19]

Poulsen et al.

[11] Patent Number: 4,466,667
[45] Date of Patent: Aug. 21, 1984

[54] LONGWALL SHEARER TRACKING SYSTEM

[75] Inventors: Peter D. Poulsen; Richard J. Stein; Robert E. Pease, all of Huntsville, Ala.

[73] Assignee: The United States of America as represented by the Administrator of the National Aeronautics and Space Administration, Washington, D.C.

[21] Appl. No.: 441,897

[22] Filed: Nov. 15, 1982

[51] Int. Cl.³ .............................................. E21C 35/08
[52] U.S. Cl. .......................................... 299/1; 175/45
[58] Field of Search ............. 175/45; 299/1; 356/373, 356/375; 250/561; 33/125 A, 125 C, 286

[56] References Cited

U.S. PATENT DOCUMENTS 3,321,248  5/1967  Williamson ........................... 33/286

FOREIGN PATENT DOCUMENTS 16297   10/1980  European Pat. Off. ................. 299/1
2416947 10/1975  Fed. Rep. of Germany .......... 299/1

OTHER PUBLICATIONS

"Laser Beam Guides Tunnel Borer", 5/66, "Coal Age", p. 116.

Primary Examiner—Ernest R. Purser
Assistant Examiner—Mark J. Del Signore
Attorney, Agent, or Firm—Joseph H. Beumer; John R. Manning; Leon D. Wofford, Jr.

[57] ABSTRACT

A tracking system for measuring and recording the movements of a longwall shearer vehicle (10) includes an optical tracking assembly (B) carried at one end of a desired vehicle path and a retroreflector assembly (A) carried by the vehicle. Continuous horizontal and vertical light beams are alternately transmitted at (38) by means of a rotating Dove prism (58) to the reflector assembly (A). A vertically reciprocating reflector (34) interrupts the continuous light beams and converts these to discrete horizontal and vertical light beam images transmitted at (68) at spaced intervals along the path. A second rotating Dove prism (64) rotates the vertical images to convert them to a second series of horizontal images while the first mentioned horizontal images are left unrotated and horizontal. The images are recorded on a film (74, 104). An overlay (106) with X and Y co-ordinates may be utilized to view the images and provide a graphical representation of the vehicle's path along the longwall coal face.

15 Claims, 9 Drawing Figures

LONGWALL SHEARER TRACKING SYSTEM

ORIGIN OF THE INVENTION

The invention described herein was made in performance of work under a NASA Contract, and is subject to the provisions of Section 305 of the National Aeronautics and Space Act of 1968, Public Law 85-568 (72 Stat. 435; 42 U.S.C. 2457).

BACKGROUND OF THE INVENTION

The invention relates to the field of cutting coal from a longwall face of a coal vein. More particularly, the invention relates to the detection of lateral and vertical deviations in the movement of a longwall coal shearer which travels along a coal face in a transverse direction for shearing coal from the face.

In longwall mining, the area to be mined is divided into blocks, perhaps 900 feet across and 5,000 feet long. Two access tunnels are cut on either side of a coal block, and a transverse tunnel is cut between access tunnels at one end of the block. A track for a longwall shearer is laid along the coal face or the floor of the tunnel in a manner that enables the coal to be sheared and dumped on a moving conveyor which then removes the coal from the mine. The ceiling along the coal face is held up by hydraulic supports that are moved forward after each cut. After the supports are advanced, the ceiling behind the supports falls in, relieving the roof stresses. Stresses in the mine roof are critical, and to control them the face is kept geometrically normal to the top, bottom, and sides of the coal block being mined. If the face becomes bowed or sheared obliquely, forces on the longwall coal face will become excessive, causing severe loads on the roof supports and making their forward movements difficult if not impossible.

In U.S. Pat. No. 4,156,971, a mechanical system is disclosed by which a longwall shearer is controlled in a path adaptive manner such that it periodically adjusts itself to maintain movement along a desired line of travel. However, this system is machine dependent, and installation requires extensive modification to a standard longwall shearer.

Accordingly, an important object of the present invention is to provide apparatus for guiding a longwall coal shearer which is simple and reliable and is readily adaptable to all models of longwall shearers.

Still another important object of the present invention is to provide apparatus for detecting lateral and vertical deviations in the movement of a longwall coal shearer for a single pass of the machine along the longwall coal face and adjusting the track after one pass to correct for any deviations observed in the prior pass.

Still another important object of the present invention is to provide apparatus for tracking and guiding a longwall shearer which assures a straight cut of the coal face and which is safe and practical under mining conditions utilizing conventional mining equipment.

Still another important object of the present invention is to provide an apparatus for tracking the movement of a longwall coal shearer which utilizes a single light source requiring no sophisticated electronics or specialized lighting equipment.

SUMMARY OF THE INVENTION

The above objectives are accomplished according to the present invention by providing a light source in the form of a mine safety lamp which is transmitted to a retroreflector attached to the forward body of the longwall shearer by means of an optical transmitter assembly consisting of an arrangement of rotating prisms and reflecting mirrors. The retroreflector is mounted on a plate which oscillates about a horizontal axis by means of a wheel attached to the end of the retroreflector mounting plate which rises and falls as it moves along the teeth of a drive rack by which the shearer is driven. In this manner, the continuous light beam reflected from the transmitter is converted to intermittent signals which correspond to the number of teeth in the drive rack and are used to give a precise longitudinal position of the shearer. The light beam from a mine safety lamp is transmitted to the optical tracking system in the form of a narrow elongated slit. A rotating Dove prism receives the slit beam and transforms the light beam into alternating narrow vertical and horizontal rectangular light beams. The vertical beam is utilized to measure lateral deviations of the shearer and the horizontal beam the vertical deviations. The vertical and horizontal light beams are reflected by the shearer-mounted retroreflector back to the optical tracking mechanism as intermittent light images. The tracking system rotates the vertical beam images to horizontal images while the horizontal images are unrotated. The two sets of images are then reflected and focused on a film negative. The two sets of images are separated on the film negative by means of a system of reflecting mirrors which reflect the two sets to opposing sides of the film. An overlay over the film provides a co-ordinate reading of the deviations in the lateral (X) and vertical (Y) positions of the vehicle for one complete pass down the longwall of the coal face. The track that the vehicle rides on may then be adjusted before the next pass so that cuts in the coal wall face may be made to correct for the previous deviations.

BRIEF DESCRIPTION OF THE DRAWINGS

The construction designed to carry out the invention will be hereinafter described, together with other features thereof.

The invention will be more readingly understood from a reading of the following specification and by reference to the accompanying drawings forming a part thereof, wherein an example of the invention is shown and wherein.

DESCRIPTION OF A PREFERRED EMBODIMENT

Figure 1:
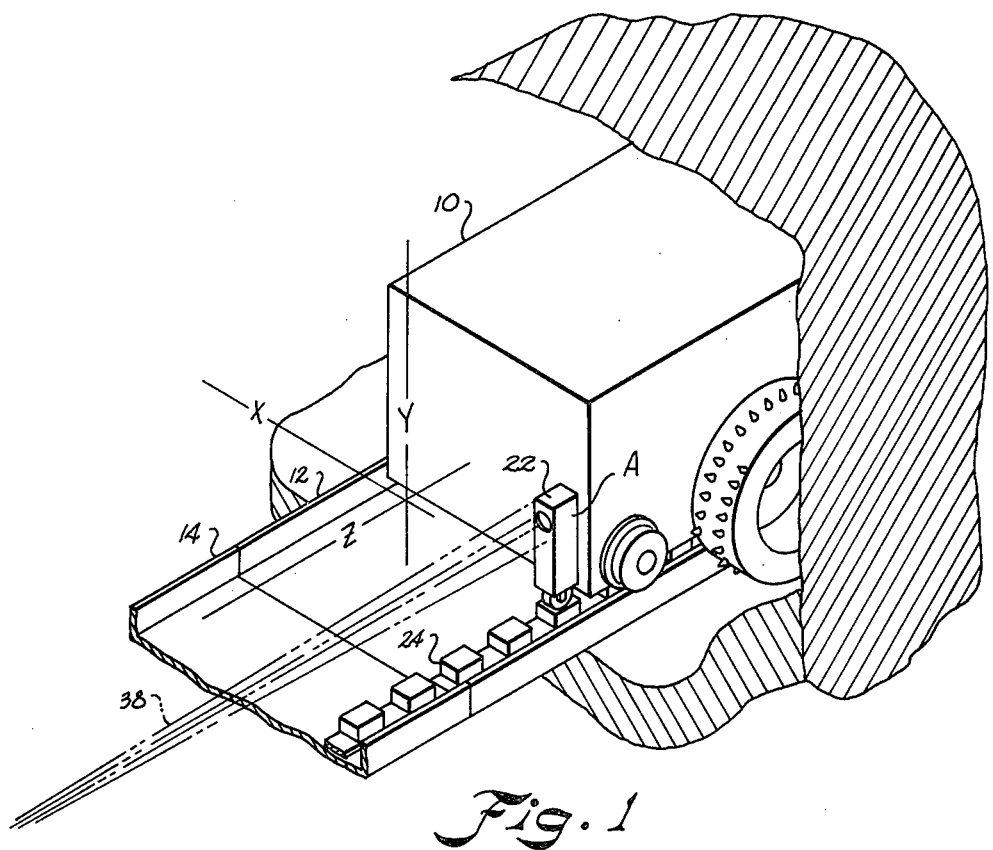
FIG. 1 is a perspective view illustrating a longwall shearing machine and tracking system therefor in accordance with the present invention.
Figure 7:
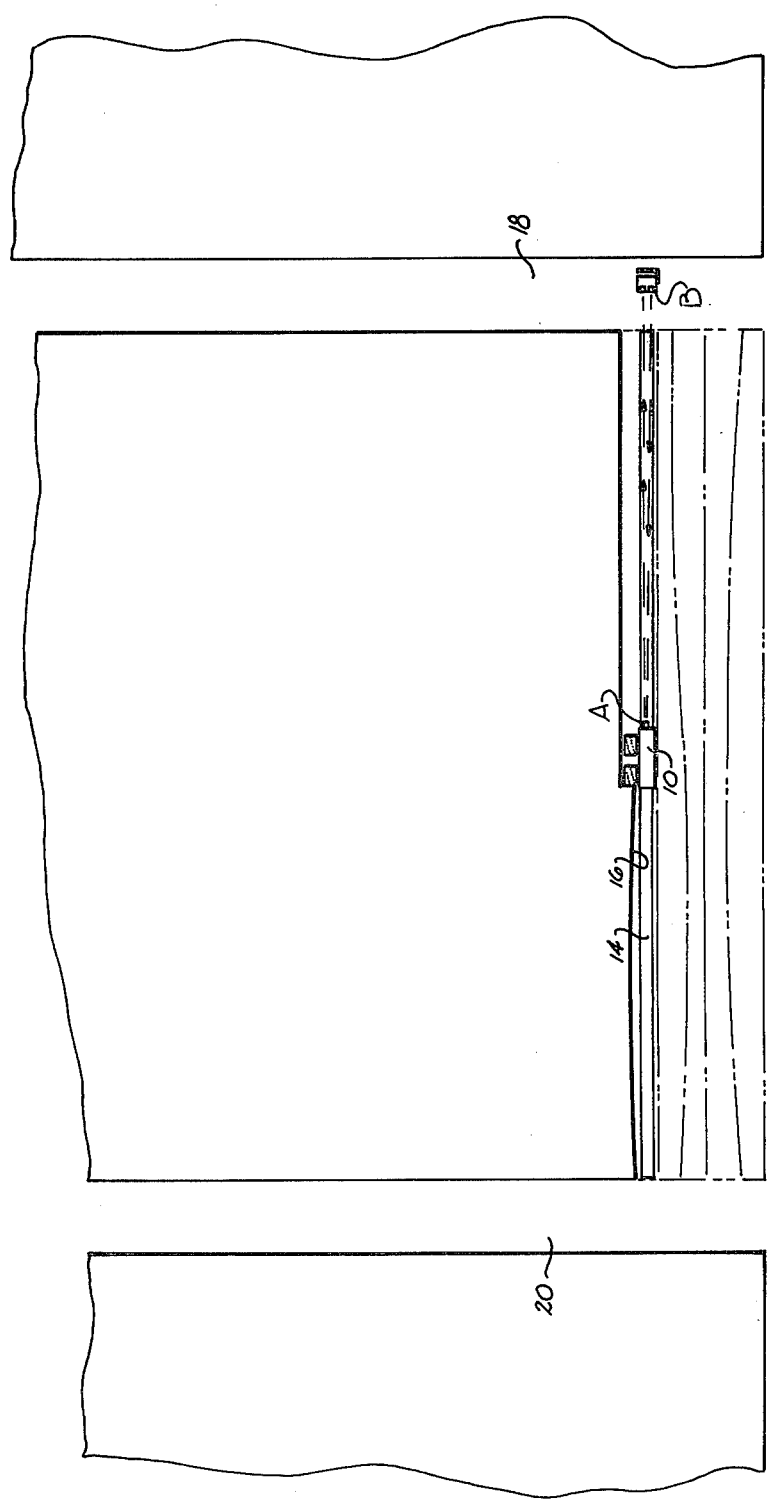
FIG. 7 is a schematic illustration of a longwall mining operation utilizing a longwall shearer and tracking system according to the present invention.

Referring in more detail to FIG. 1 of the drawings, there is a longwall shearing machine 10 operating on track section 12 of a length of track 14 as shown in FIG. 7, as parallel to a coal face 16 and extending between access tunnels 18 and 20. There is also included a toothed rack 24 mounted on rack 14 and extending the entire length of the track in which a drive gear (not shown) meshes for driving the machine. For more details of a conventional longwall coal mining system reference may be had to U.S. Pat. No. 4,156,971 which is hereby incorporated herein. The longwall shearer 10 has positioned on an end of the machine a retroreflector assembly A which includes a retroreflector.

Figure 2:
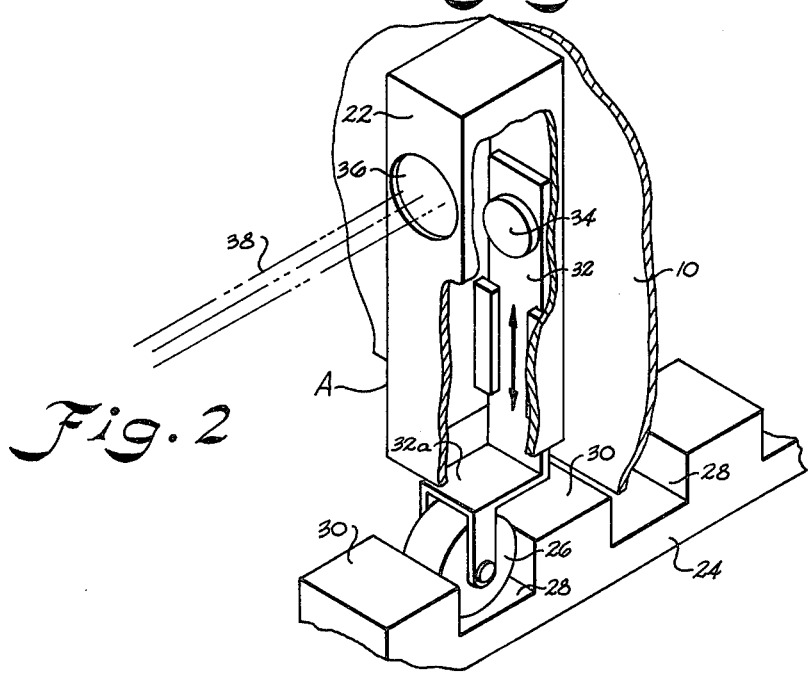
FIG. 2 is a perspective view illustrating a light beam retroreflector assembly constructed according to the present invention.

Referring to FIG. 2, assembly A provides a retroreflector means which includes a retroreflector housing 22 which is mounted on the longwall shearer 10 in a vertical position and in such a manner as to allow a wheel 26 to alternately extend into a tooth gap 28 and ride over raised surface 30. Wheel 26 is attached to a lower horizontal element 32a of plate 32 which has mounted on its upper end a conventional retroreflector 34. As the longwall shearer 10 propells itself along track 14 by means of an electric motor driving the toothed gear meshing with the teeth on rack 24, wheel 26 moves in and out of gaps 28 causing plate 32 to move vertically within the retroreflector housing 22 thereby exposing mirror 34 to a window opening 36 which is receiving light signals 38 transmitted by an optical tracking assembly B. This provides a means for converting continuous light beams from a tracking assembly into discreet light beam images as will be more fully explained hereinafter.

Figure 3:
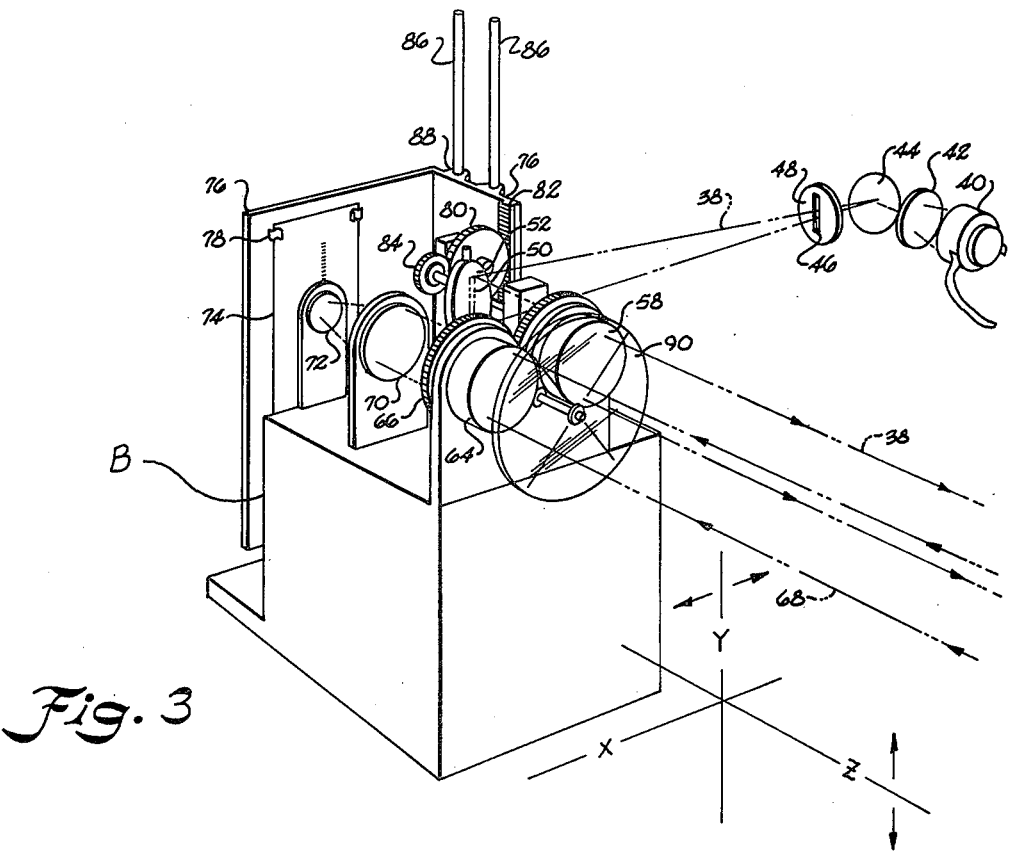
FIG. 3 is a perspective view illustrating an optical tracking assembly constructed according to the present invention.

Referring to FIG. 3, the light signal 38 originates at a miner safety lamp 40 or any suitable mine safe source. From the lamp 40 the light signal 38 passes through a conventional focusing lens 42 and onto a mirror 44 positioned so as to turn the signal ninety degrees and project it through a rectangular slot 46 in a plate 48. A rectangular light image 50 is thus produced. Rectangular light image 50 is then transmitted to optical tracking assembly B which provides a means for optically tracking the machine.

Figure 4:
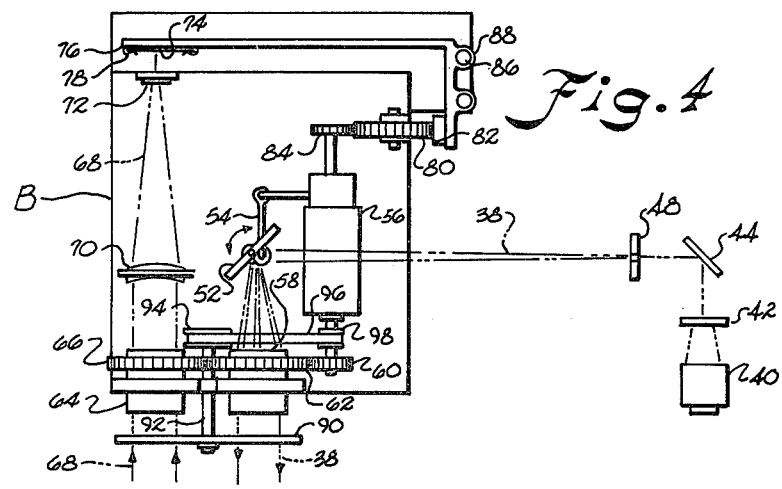
FIG. 4 is a plan view of the optical tracking assembly of FIG. 3.

Tracking assembly B includes a light transmission means and receiving means which will now be described. Rectangular light images 50 are projected by plate 48 onto a pivotally mounted mirror 52. Mirror 52 is pivoted via linkage 54 as shown in FIG. 4 which is actuated by a conventional geneva gear or suitable cam means powered by and attached to clock escapement mechanism 56 which may be mechanically powered. Mirror 52 rocks back and forth through an angle of ninety degrees by the above described drive and linkage arrangement. The pivoting motion of mirror 52 effects a sweeping motion of rectangular light image 50 across the surface of a conventional Dove prism 58. This sweeping motion causes the light signal 38 projected by the prism 58 to sweep the area in which the shearer 10 is located and search out the retroreflector 34.

A unique property of the Dove prism is that when it is rotated forty-five degrees it rotates the image being projected through it ninety degrees from a vertical to horizontal and back on the next forty-five degree rotation. In this manner, two separate continuous beam images are projected through the same prism. The vertical image is used to detect any horizontal deviation (X axis) of the longwall shearer 10 from the desired path along the coal face 16. The horizontal beam image is used to detect any vertical deviation (Y axis) from the desired path along the coal face 16. Dove prism 58 is rotated by the clock escapement 56 via a shaft gear 60 and a gear 62 mounted circumferentially on the Dove prism 58.

The optical tracking means further includes light receiving means which includes a second conventional Dove prism 64 with a circumferential gear 66 which is meshed with gear 62 and timed so that with each rotation of Dove prism 58, Dove prism 64 will rotate a like amount. The light signal 38 projected towards the longwall shearer 10 is reflected back to Dove prism 64 by mirror 34 when exposed by the vertical movement of wheel 26 on the retroreflector. This vertical movement causes an interrupted discrete signal 68 of either the vertical or horizontal continuous beam image to be received by Dove prism 64 with signal intervals to be determined by the speed of longwall shearer 10.

The signal 68 as received by prism 64 is projected through lens 70 onto a conventional focusing lens 72 which, in turn, projects the signal 68 onto Polaroid film 74 which provides a means for recording the images. Polaroid film 74 is mounted on plate 76 by means of holding clips 78. An orderly progression of discrete images is obtained by the vertical travel of plate 76. This vertical travel is the result of a gear 80 causing a gear rack 82 which is fixed to plate 76, to move vertically when gear 80 is turned by gear 84. The proper distance between film 74 and lens 72 is maintained by rods 86 which are enclosed by bosses 88. Prism 64 is timed with prism 58 in such a manner so as to accept the horizontal image and to rotate the vertical image received so that all images projected onto the polaroid film 74 are horizontal images. Two sets of horizontal images are thus recorded on the film. One set corresponds to lateral deviations (X-direction) and the other set corresponds to vertical deviations (Y-directions).

A decoupling means for separating the two sets of horizontal deviation images from each other is provided by color filter 90. Color filter 90 is attached to shaft 92 which carries pulley 94. Belt 96 transfers power from pulley 98 to pulley 94 and turns color filter 90 which consists of two color filters in four alternating quadrants. Color filter 90 is timed to rotate ninety degrees for every forty-five degree rotation of prisms 58 and 64. The alternating color rotation causes two alternating color signals to be imaged on polaroid film 74 which in this instance, would itself be color film. The original horizontal images are a first color and the second set of horizontal images (rotated vertical images) are a second color. The decoupling means would further include a color filter through which the film 74 must be viewed in order to separately view the two sets of images independently of one another.

The color filter may be provided in the form of an overlay having the desired path and a scale of deviation co-ordinates. The operator can view the images in order along the path axis and separate them by colors to ascertain the deviation of the longwall shearer 10 from the desired path.

Figure 8:
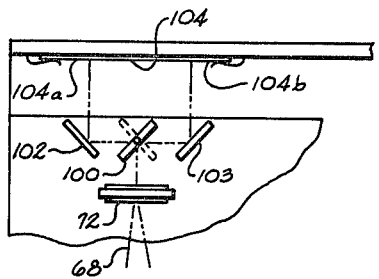
FIG. 8 is a partial view of an arrangement for decoupling sets of horizontal images and projecting them separately upon a film negative in accordance with the tracking mechanism of the present invention.
Figure 9:
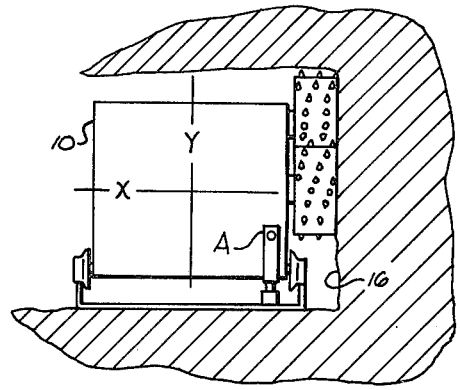
FIG. 9 is an elevation illustrating a longwall coal shearer traversing the longwall of a coal face as tracked and guided according to the present invention.

An alternate method of decoupling the images is illustrated in FIG. 8. A decoupling means includes a decoupling mirror system which includes a lens 72 which projects image 68 onto a pivotally mounted mirror 100 which turns the image ninety degrees onto another fixed mirror 102 and then onto one side 104a of a polaroid film 104. The mirror 100 then pivots ninety degrees via any suitable cam means and projects the alternate signal onto mirror 103, then onto an opposing side 104b of polaroid film 104. Two completely separate or decoupled sets of images are obtained. The film 104 may be inserted underneath a transparent overlay 106 which contains a visual graphical representation of the desired path in the X and Y directions and corresponding deviations co-ordinates. With this method, color filter 90 is not required.

Figure 5:
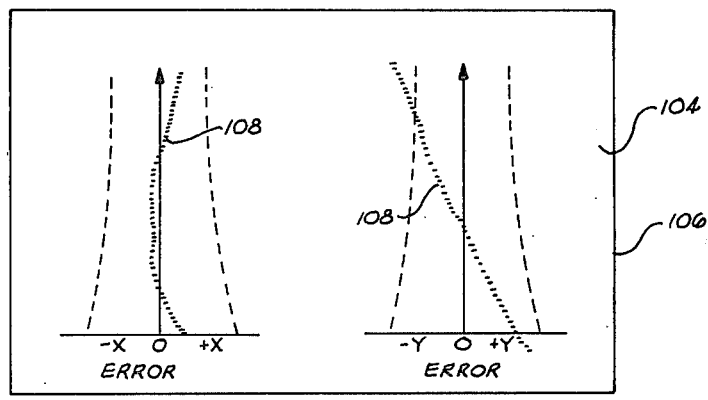
FIG. 5 is a graphical illustration of an uncorrected path of a longwall shearer.
Figure 6:
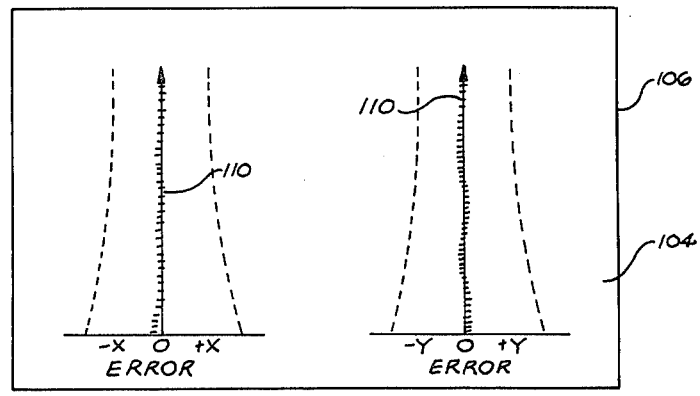
FIG. 6 is a graphical illustration of a longwall shearer path as corrected after tracking deviations in the previous path in accordance with the present invention.

After viewing the polaroid film 104 the operator then adjusts the next pass of the longwall shearer 10 along coal face 16 by adjusting the track layout so as to compensate for the deviations of the previous pass. FIG. 5 illustrates the uncorrected path 108 of the longwall shearer 10 as indicated by polaroid film 104. FIG. 6 illustrates the corrected path 110 of the longwall shearer 10 as indicated by polaroid film 104. The same process would be used in analyzing film 90 and correcting the path on the next pass of the coal shearer vehicle by manually adjusting the track path in a well known manner.

While a preferred embodiment of the invention has been described using specific terms, such description is for illustrative purposes only, and it is to be understood that changes and variations may be made without departing from the spirit or scope of the following claims.

What is claimed is:

1. Apparatus for tracking the movement of a longwall coal shearer along a desired path along a longwall coal face of the type which travels over rails and is driven by means of a drive gear and toothed drive rack, said apparatus comprising:
   a continuous rectangular light beam image;
   optical tracking means carried at one end of said path including light transmission means for converting said rectangular light beam image into separate alternating continuous horizontal and vertical rectangular light beams and alternately transmitting said horizontal and vertical light beams down said path;
   retroreflector means carried by said shearer for receiving said alternating continuous horizontal and vertical light beams;
   said retroreflector means including means for converting said alternating continuous horizontal and vertical light beams into a series of discreet horizontal and vertical light beam images at periodic intervals along said path which are reflected back to said optical tracking means;
   said retroreflector means reflecting said horizontal and vertical light beam images responsive to the vertical and horizontal deviations, respectively, in the movement of said shearer and corresponding displacement of said retroreflector means from said desired path as carried thereon;
   said optical tracking means including optical receiving means receiving said horizontal and vertical light beam images; and
   recording means for recording said images as a function of the position of said shearer along said path for viewing so that the travel of said shearer may be corrected.

2. The apparatus of claim 1 including means for transmitting said horizontal and vertical light beams in a sweeping motion to cover an area in which said shearer travels and impinge upon said retroreflector means.

3. The apparatus of claim 1 wherein said transmission means includes a prism and means for rotating said prism such that light from said source is transmitted and rotated through said prism into horizontal and vertical rectangular light beams.

4. The apparatus of claim 1 wherein said receiving means includes a prism which is rotated such that said vertical beam image is rotated horizontal while said horizontal is left unrotated and horizontal whereby series of discrete horizontal images are recorded by said recording means.

5. The apparatus of claim 4 including decoupling means for decoupling and separating said series of discrete horizontal images into separated images representing deviations in said lateral and vertical shearer positions.

6. The apparatus of claim 1 wherein said optical receiving means includes means for rotating said vertical beam image to a second horizontal beam image while leaving said first mentioned horizontal beam image unrotated and horizontal.

7. The apparatus of claim 6 wherein said recording means includes a light sensitive film on which said horizontal light beam images are recorded as film images.

8. The apparatus of claim 7 including decoupling means for decoupling and separating said first and second horizontal images on said film for separated viewing of said lateral and vertical deviation measurements.

9. The apparatus of claim 8 wherein said apparatus includes a color filter for converting said first and second horizontal images into images of two different colors on said film.

10. The apparatus of claim 8 wherein said decoupling means includes an overlay color filter which may be utilized to separately view said different color images after formed on said film.

11. The apparatus of claim 8 wherein said decoupling means includes a system of decoupling reflectors which reflect said first and second horizontal images on opposite sides of said film.

12. The apparatus of claim 1 wherein said retroreflector means includes a retroflector carried for vertical reciprocation on said shearer to interrupt said horizontal and vertical light beams at periodic intervals along said path to produce said discrete horizontal and vertical light beam images.

13. The apparatus of claim 12 including a housing carried on said shearer having a window, a vertically reciprocating plate carried in said housing, said reflector carried on said plate to reciprocate vertically in and out of said window to interrupt said horizontal and vertical beams.

14. The apparatus of claim 13 including a rider carried on said plate which rides up and down the teeth of said drive rack to reciprocate said reflector periodically along said path.

15. Apparatus for tracking the movement of a longwall coal shearer along a desired path along a longwall coal face of the type which travels over rails and is driven by means of a drive gear and toothed drive rack, said apparatus comprising:

a rectangular light beam;

an optical tracking means which includes a light beam transmission means and a light beam image receiving means carried at one end of said path;

said light beam transmission means converting said rectangular light beam into separated alternating horizontal and vertical rectangular light beams which are transmitted along said path;

retroreflector means carried by said vehicle for receiving said alternating horizontal and vertical light beams;

reciprocating means carrying said retroreflector means and reciprocating said retroreflector means vertically to interrupt the reception of said horizontal and vertical light beams at periodic intervals along said path providing a series of discrete horizontal and vertical light beam images reflected back to said optical receiving means;

said reflected horizontal and vertical discrete light beam images being reflected in response to the vertical and horizontal displacements, respectively, in the position of said shearer and corresponding spacing of said retroreflector means as carried thereby;

said optical receiving means rotating said vertical discrete light beam images to a second series of horizontal light beam images while receiving and transmitting said first mentioned series of horizontal images unrotated as horizontal images;

recording means for recording said first and second series of horizontal images as a function of the position of said shearer along said path; and decoupling means for separating said first and second series of horizontal images so that said horizontal images may be viewed separately from one another so that deviations in the lateral and vertical positions of said shearer may be viewed and determined separately.

* * * * *